(12) United States Patent
Miescher

(10) Patent No.: US 6,234,736 B1
(45) Date of Patent: May 22, 2001

(54) FASTENING ELEMENT FOR PLATE-SHAPED INSULATION ELEMENT

(75) Inventor: Stefan Miescher, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/563,578

(22) Filed: May 3, 2000

(30) Foreign Application Priority Data

May 7, 1999 (DE) ................................ 199 21 151

(51) Int. Cl.$^7$ .......................... F16B 15/02; F16B 43/00
(52) U.S. Cl. .................... 411/533; 411/480; 411/531; 411/908
(58) Field of Search .................. 411/383, 480, 411/482, 531, 533, 908

(56) References Cited

U.S. PATENT DOCUMENTS

| | | | |
|---|---|---|---|
| 5,118,235 | * | 6/1992 | Dill ................................ 411/533 X |
| 5,171,118 | * | 12/1992 | Rothenbuhler ................... 411/533 X |
| 5,779,421 | * | 7/1998 | Beck et al. ...................... 411/533 X |

* cited by examiner

*Primary Examiner*—Neill Wilson
(74) *Attorney, Agent, or Firm*—Brown & Wood, LLP

(57) ABSTRACT

A fastening element for securing plate-shaped insulation materials and including a large-surface, flat clamping member (2), a hollow stem (3) projecting from the clamping member (2) and enclosing a hollow space (4) that opens into an opening (6) formed in the clamping member (2), and at least one plate-shaped cover (7, 8) for closing the opening (6) attached to the clamping member (2) and including a substantially linear flexor (9) provided in an immediate vicinity of the opening (6) formed in the clamping member and spatially bent in such a way that it extends in a plane (V) inclined to a plane (E) defined by the clamping member (2) and to a plane (A) extending parallel to an axis of the hollow stem (3).

9 Claims, 3 Drawing Sheets

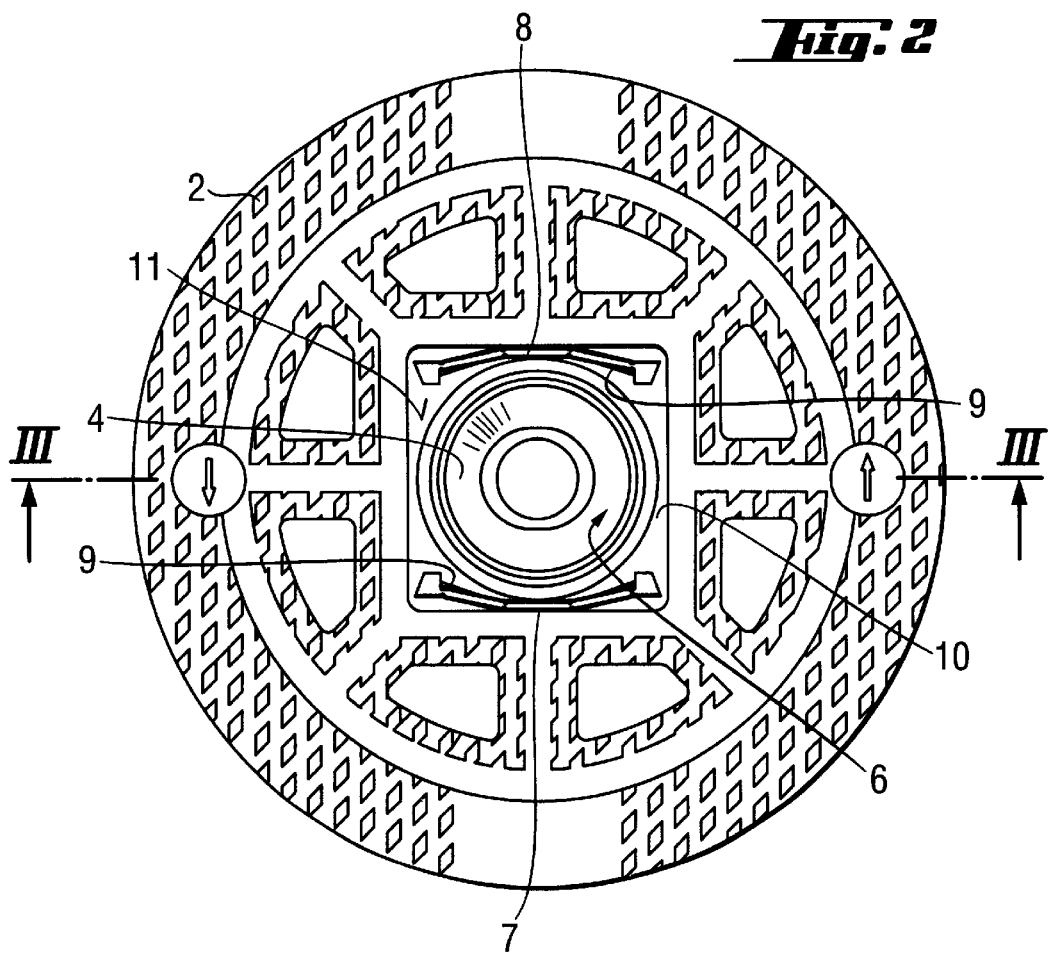
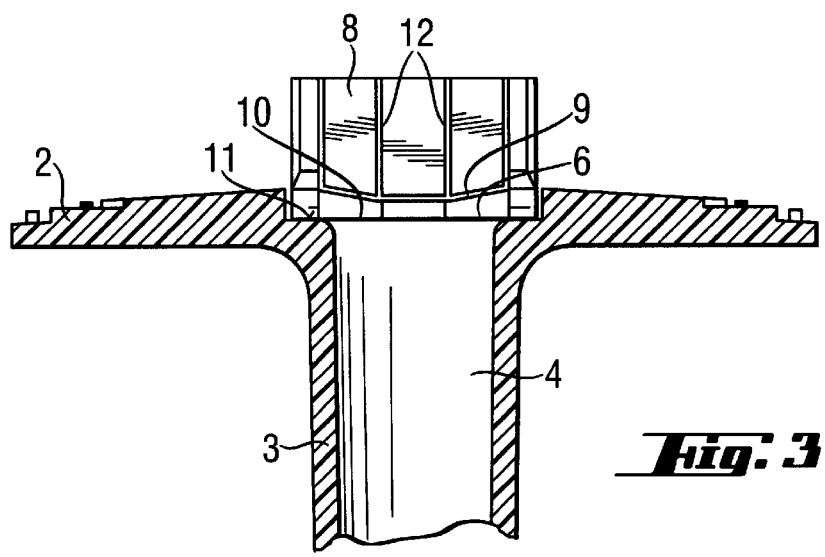

FASTENING ELEMENT FOR PLATE-SHAPED INSULATION ELEMENT

BACKGROUND OF THE INVENTION

1. Field of the Invention

The present invention relates to a fastening element for securing plate-shaped insulation materials and including a large-surface, flat clamping member, a hollow stem projecting from the clamping member and enclosing a hollow space that opens into an opening formed in the clamping member, and at least one plate-shaped cover for closing the opening and attached to the clamping member.

2. Description of the Prior Art

Insulation materials, in particular, insulation boards are used for heat insulation and partially also for noise insulation of walls and ceilings. Conventionally, the insulation boards are secured to a raw masonry. For securing the plate-shaped insulation materials, fastening elements, which have a large-surface, flat clamping plate from which a stem projects, are used. The stem extends into the insulation board. The fastening element is secured to the masonry primarily with a dowel-like or nail-like anchoring member that forms an extension of the stem. The dowel-like anchoring member is inserted in a pre-drilled bore formed in the masonry and in anchored in the masonry bore by being expanded. A nail-like anchoring member is directly driven into the masonry, without preliminarily forming a bore in the masonry. A bore formed in the stem and opening into the clamping member insures access for an expansion screw or a similar expansion member used for expanding the dowel-like member or to a nail-like member. After the masonry is covered with the insulation material plaster is applied.

The dowel-like anchoring member can, e.g., be formed integrally with the hollow stem. However, primarily, dowel sleeves are used which are inserted through the hollow stems and project therefrom.

It is important that the plaster material does not penetrate into the inner space of the hollow shaft as this can result in formation of a cavity in the surface of the applied plaster layer. If the plaster material and, thereby, moisture penetrates in the interior of the hollow stem, the moisture can cause corrosion of the anchoring member. In addition, there is a danger of formation of thermal bridges which adversely affect functioning of the insulation.

The prior art discloses proposals to close the opening in the clamping member that would permit to prevent the penetration of the plaster and moisture into the interior of the hollow stem. E.g., U.S. Pat. No. 5,118,235 suggests to close the opening with a cover which is connected to the clamping member for a pivotal movement about an axle arranged in the region of the opening. In the closed position, the pivotal cover cooperates with a projection extending from an inner wall of the hollow stem. With this cover, there is a danger that during closing or during application of the plaster, the cover would be inserted so deep that the opening would not be corrected closed. On the other hand, if the cover is not adequately inserted into the opening, the cover would protrude. As a result, the opening again would not be adequately closed. During plastering, the cover can be open even more in the later case. With an inadequate closing of the opening, the plaster material and moisture can penetrate into the inner space of the hollow shaft. In addition, the cover itself is an obstacle to the application of plaster when it protrudes from the opening. This can bring undesirable results. In the open position, the pivotal cover can occupy a random position. On many occasion, the cover partially covers the opening. This presents an obstacle to driving-in of the anchoring member and forces a worker to keep the cover away with one hand while placing the anchoring member into the hollow stem with the other hand.

Accordingly, an object of the present invention to eliminates the drawbacks of the prior art cover.

Another object of the present invention is to provided a fastening element for securing plate-shaped insulation elements which would insure a reliable closing of the opening.

A further object of the present invention is to provide a fastening element the cover of which, in an open position, would not hinder access to the interior of the hollow stem.

A still further object of the present invention is to provide a fastening element that can be simply and cost-effectively produced.

SUMMARY OF THE INVENTION

These and other objects of the present invention, which will become apparent hereinafter, are achieved by providing a fastening element for securing plate-shaped insulation materials or boards and including a large-surface clamping member and a hollow stem projecting from the clamping member. The hollow stem encloses a hollow space that opens into an opening formed in the clamping member and closed by at least one plate-shaped cover attached to the clamping member. The closing cover includes a substantially linear flexor provided in an immediate vicinity of the opening formed in the clamping member. The flexor is bent in such a way that it extends in a plane inclined to a plane defined by the clamping member and to a plane extending parallel to an axis of the hollow stem.

The closing cover according to the present invention insures a reliable closing of the opening in the clamping member of the inventive fastening element. The spatially bent linear flexor insures that the closing has two defined end positions in which the cover is free from tension and compression strains. Only during the transition from an open condition to a closed condition, tension and compression strains appear in the closing cover. The strains reach their maximum magnitude exactly when the closing cover occupies an intermediate position that corresponds to a plane n which the flexor extends. This intermediate position is unstable, and the closing cover automatically seeks to achieve an energetically favorable end position, either the open position or the closed position. The advantage of the closing cover occupying an end position consists in that during mounting of the fastening element, the closing cover does not occupy any undefined position which could interfere with the mounting process. In the folded end position, the closing cover does not change this energetically favorable position and insures a reliable closing of the opening, preventing an accidental penetration of the plaster material or moisture. The fastening element according to the present invention does not need to meet any particular manufacturing requirements as is the case of manufacture of the fastening elements of the state of art. Therefore, the fastening element can be produced by a conventional cost-effective mass-production process, e.g., by plastic infection-molding.

By selecting the inclination angle of the plane, in which the flexor extends, to the plane of the clamping plate or member, the resistance of the closing cover to a change in its open or closed position can be manipulated. The inclination angle also defines the relative position of the closing cover. Preferably, the inclination angle toward the plane, which extends parallel to the axis of the hollow stem, is equal to from about 30° to about 75°. Preferably, an inclination angle of 45° is selected. At this angle, symmetrical force relationships are obtained to a most possible extent, and the closing cover extends in its open position, substantially perpendicular to the surface of the clamping plate According to a preferred embodiment of the present invention, the clamping member has a depression surrounding the opening for receiving the plate-shaped closing cover. In this way, in its closed position, the closing cover is located in the depression and does not project or projects only to a negligible extend over the surface of the clamping member. The depression forms, at least at a side of the opening opposite the flexor, a stop shoulder which provides support for the closing cover in its closed position. Also, the stop shoulder prevents the closing cover, during closing of the opening, from extending into the interior of the hollow space in the stem. In accordance with a preferred embodiment of the invention, the depression forms a substantially continuous stop shoulder along the entire circumference of the opening Because of the bent hinge line of the flexor, the edge and the interior regions of the cover are subjected to different tensile and compression strains.

Therefore, in both of its end positions, the closing cover bulges in opposite directions in order to eliminate the tensile and compression strains generated during closing and opening of the cover. The curvature of the flexor is so selected that in the closed position, the closing cover becomes concave, bulging in a direction toward the opening. In its open position, the closing cover bulges convexly away from the opening. In order to achieve the desired bulging of the closing cover, the cover has predetermined bent lines extending form the flexor to opposite free ends of the closing cover.

In an advantageous, from the manufacturing point of view, embodiment according to the present invention, the bent flexor is formed as a film hinge.

It is advantageous for a proper dimensioning of the bent flexor, when two plate-shaped closing covers are provided for closing the opening. The two closing covers are attached to the clamping member at opposite sides of the opening. They extend from a respective bent flexor in a direction toward the opposite cover. With two closing covers, the length of the cover measured from the flexor can be reduced as it need not cover the entire opening. With a shorter closing cover, The curvature of the flexor can be also reduced, without a reduction in the force necessary for change the end position of the cover.

The length of the two closing covers can be so selected that they partially overlap each other in their closed positions. Advantageously, however, each cover covers, in its closed, folded condition, only about half of the opening. Therefore, it is unimportant which of the two covers covers its half of the opening first. There in no or only negligible projection of the covers above the surface of the clamping member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show:

FIG. 2 a plan view of the fastening element shown in FIG. 1;

FIG. 3 a cross-sectional view of the fastening element along line II–II in FIG. 2;

DETAILED DESCRIPTION OF THE
PREFERRED EMBODIMENT

Figure 1:
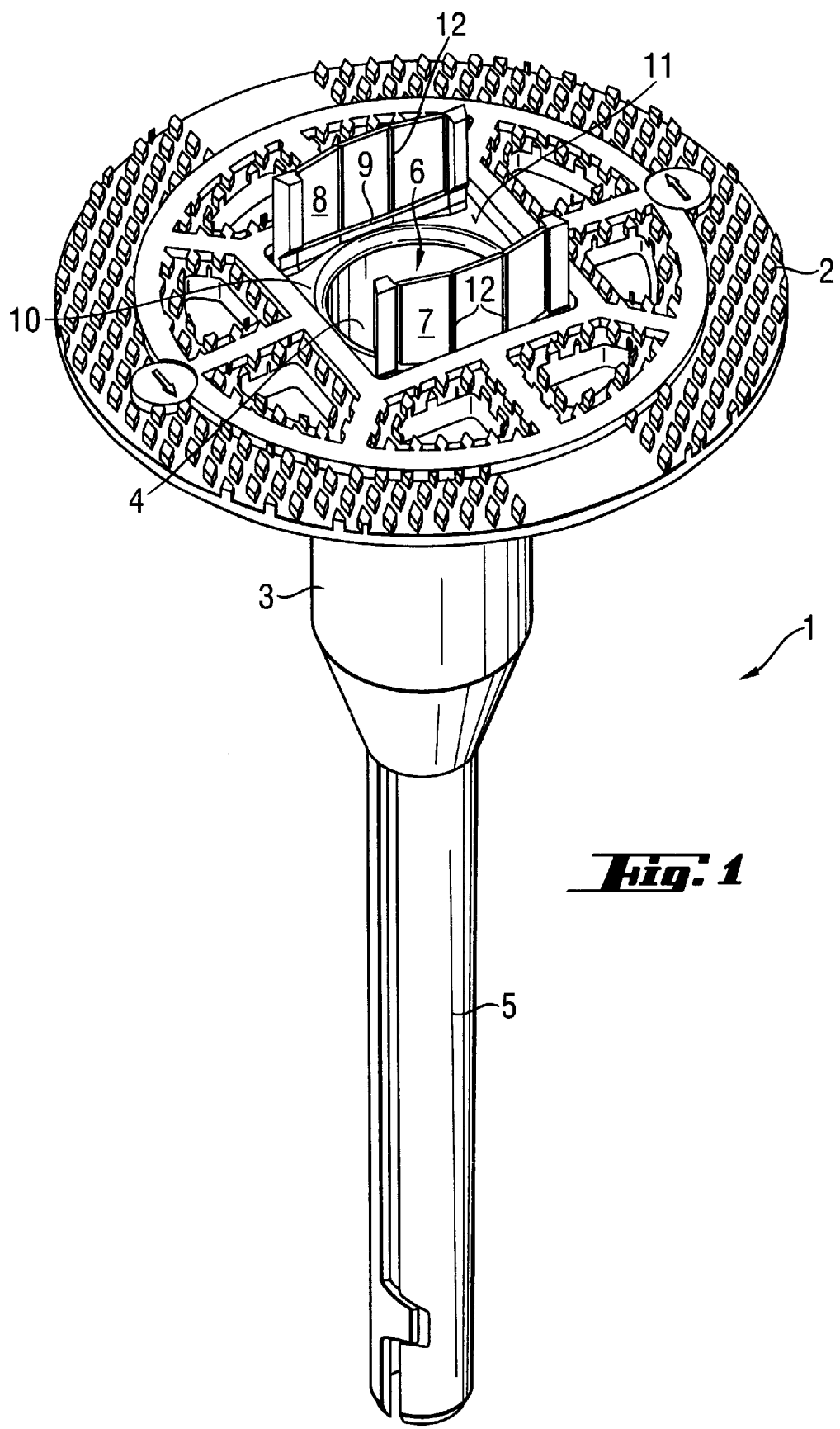
FIG. 1 a perspective view of a fastening element according to the present invention.

A fastening element according to the present invention for securing plate-shaped insulation materials, which is shown in FIG. 1, is generally designated with a reference numeral 1. The fastening element 1 has a large-surface, flat clamping member 2 from which a hollow stem 3 projects. The hollow stem 3 encloses a hollow space 4 that opens into a central opening 6 in the clamping member 2. An anchoring member 5 forms an axial extension of the hollow stem 3. The anchoring member 5 can be formed as a dowel-like or nail-like member for anchoring the fastening element 1 in a constructional component, e.g., concrete or masonry. The anchoring member 5 can be formed integrally with the hollow stem 3. However, primarily, the anchoring member 5 is formed as a separate member that extends through the opening 6 and is supported at an end of the hollow stem 3 opposite the opening 6 and projects through an opening at the opposite end. The opening 6 provides access for a setting tool for driving the anchoring member 5.

For closing the opening 6, two flap-like closing covers 7, 8 are connected to the clamping member 2 at opposite sides of the clamping member 2. In the clamping member, in the region of the opening 6, there is provided a rectangular or square depression 10 in which the closing covers 7, 8 are received in a closed position of the covers 7, 8. The bottom of the depression 10 forms, around the edge of the opening 6, a substantially closed stop shoulder 11 for the closing covers 7, 8. A closing cover 7, 8 extends, respectively, from a flexor 9 to the opposite closing cover 7, 8. The length of the closing cover 7, 8 is so selected that in their closed position, the free edge regions thereof adjoin each other, with each closing cover 7, 8 covering about half of the opening 6. In FIG. 1, the predetermined bending lines 12 extend from the flexor 9 to free edges of the closing covers 7, 8, respectively.

In FIGS. 2 and 3, the respective reference numerals corresponds to those of FIG. 1. As shown in FIGS. 2–3, the flexor 9 is formed substantially linear with a plastic bent section. The flexor 9 extend in the vicinity of the opening 6 and is located in the depression 10. In the axial direction, it extends substantially from the surface of the clamping member 2 to the bottom of the depression 10 which forms the stop shoulder 11, as shown in FIG. 3.

Figure 4:
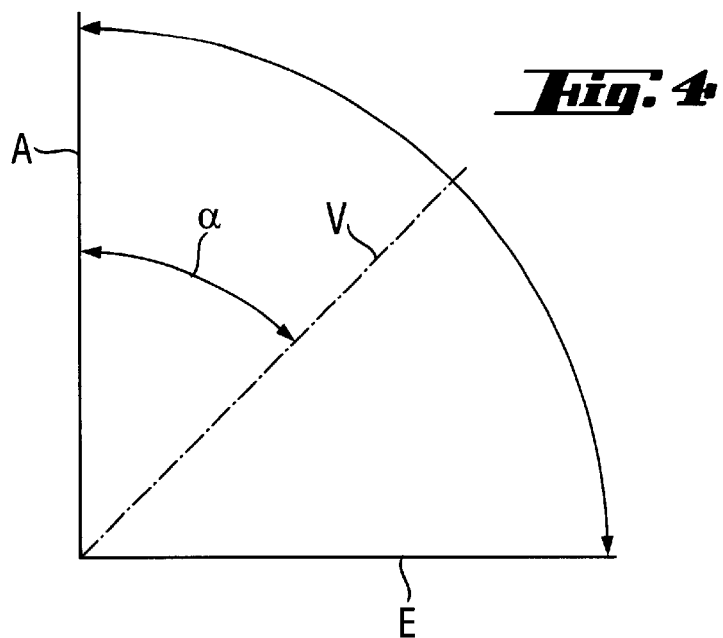
FIG. 4 a schematic view illustrating angular relationship between planes associated with open and closed positions of the closing cover of the fastening element.
Figure 5:
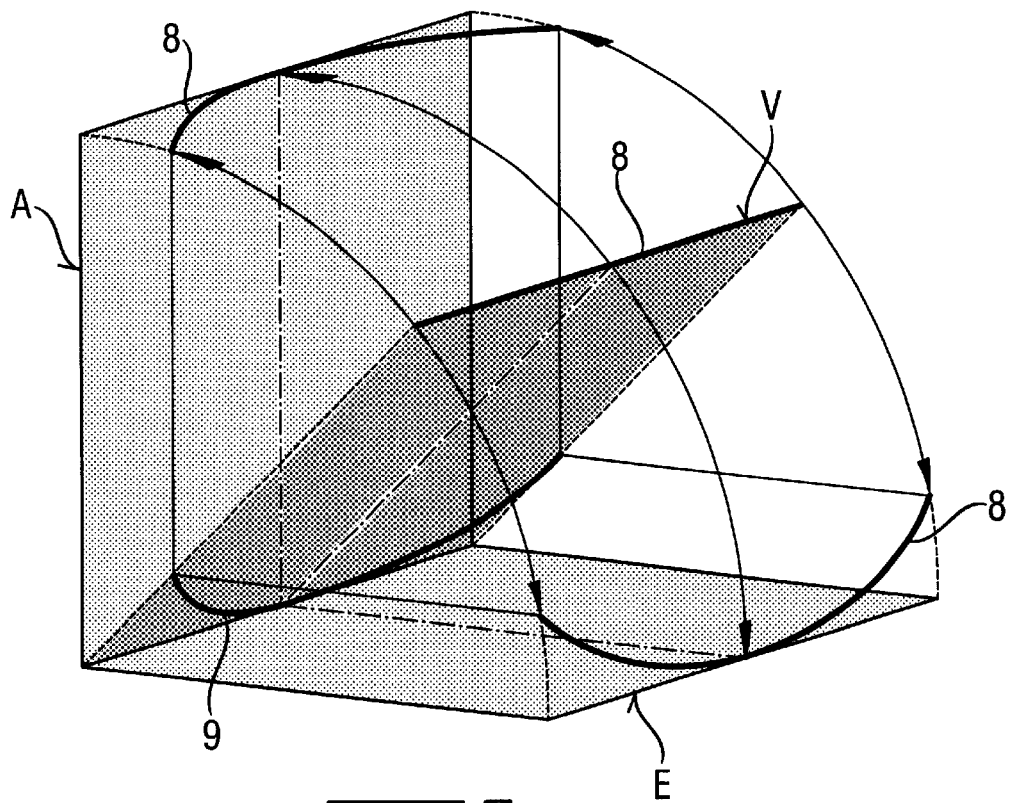
FIG. 5 a schematic view illustrating spatial relationships between planes associated with closed and pen positions of the closing cover.

The geometrical relationships of the closing cover 7, 8 will be explained with reference to FIGS. 4 and 5. In FIGS. 4–5, a plane, which extends substantially parallel to the axis of the hollow stem 3 is designated with a reference character A. A plane, which coincides with the surface of the clamping member 2, is designated with a reference character V. The plane A symbolizes the end position of the open closing cover 8. The plane E symbolizes the closed end position of the closing cover 8. The plastic hinge line of the flexor 9 intersects the plane V which is inclined relative to the plane E. The inclination angle, which the plane V forms with the plane A is designated in FIG. 4 with a Greek letter α. The inclination angle αlies in a range from about 30° to about 75°. Preferably, the angle a is selected to be equal to 45°. At this angle, for the closing cover, with respect to acting compression and tensile strains, the symmetrical relationships can be obtained to a most possible extent.

The tension and pressure forces acting on the closing cover 8 during opening and closing of the closing cover 8, are different and depend on whether an edge section or a further inwardly located region of the closing cover 8 is considered. Thereby, the closing cover is shown, in its open and closed positions, which are symbolized by the planes A and E, somewhat bulging. The plastic curvature of the flexor 9 is so selected that the closing cover 8 is convex, in its open position, and bulges in a direction away from the opening 6, and in its closed position, is concave, bulging in a direction toward the opening 6. Because of bulging, the geometrical course of the closing cover 8 in its end position does not anymore completely coincides with the planes A and E, shown in FIG. 4, and only apex regions of the bulged closing cover 8 are located in planes A and E, as it is also in FIG. 5.

In order for the closing covers 7, 8 to easily change the bulging direction during closing or opening, there are provided pre-determined bent lives which extend from the bent flexor 9 to respective free edges of the closing covers 7, 8. These lines, as it was discussed previously, are designated with a reference numeral 12 and are shown in FIG. 1. The transition from a convex bulging to a concave bulging is effected in an intermediate position in which the closing covers 7, 8 are subjected to highest compression and tension strains. This intermediate position corresponds to the plane V in which the plastic bent flexor 9 is located (FIGS. 4–5). The plane V represents an unstable position of the covers 7, 8. Because the closing covers 7, 8 are subjected to the highest compression strains in their intermediate position, the cover 7, 8 tries to occupy an energetically favorable position that is achieved in both closed and open positions shown in FIGS. 4–5 by planes A and E.

Thus, both end positions represent stable positions of the closing covers 7, 8. In order to displace the closing cover 7, 8 from either open position or the closed position, a minimal force should be applied which, e.g., during opening, should be greater than the closing force acting on the closing cover.

The flexor according to the present invention can be used not only in fastening elements for securing plate-shaped insulation materials and have a clamping member the opening of which is covered with two flap-like closing covers. The flexor according to the present invention can also be used in fastening elements having only one closing cover for fixing the closing cover in a predetermined stable end position, in its open or closed condition, without any auxiliary means and with application of only a minimal force. The fastening element at least partially is formed of a plastic material. In particular, the clamping member with the hollow stem and the closing covers which all produced, in a mass production, by an injection-molding process. The bent flexor is, advantageously formed as a hinge element.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A fastening element for securing plate-shaped insulation materials, comprising a large-surface, flat clamping member (2); a hollow stem (3) projecting from the clamping member (2) and enclosing a hollow space (4) that opens into an opening (6) formed in the clamping member (2); at least one plate-shaped cover (7, 8) for closing the opening (6) and attached to the clamping member (2); and an anchoring member (5) forming an extension of the hollow stem (3), the closing cover (7, 8) including a substantially linear flexor (9) provided in an immediate vicinity of the opening (6) formed in the clamping member and spatially bent in such a way that it extends in a plane (V) inclined to a plane (E) defined by the clamping member (2) and to a plane (A) extending parallel to an axis of the hollow stem (3).

2. A fastening element according to claim 1, wherein the plane (V), in which the flexor (9) extends, is inclined to the plane (E) defined by the clamping member (2) in a direction toward the plane (A) extending parallel to the axis of the hollow stem (3), at an angle (α) amounting from about 30° to about 75°.

3. A fastening element according to claim 2, wherein the inclination angle (α) amounts to about 45°.

4. A fastening element according to claim 1, wherein the clamping member (2) has a depression region (10) surrounding the opening (6) for receiving the closing cover (7, 8), the depression region (10) forming, at least at a side of the opening (6) opposite the flexor (9), a stop shoulder (11).

5. A fastening element according to claim 4, wherein the depression region (10) forms a substantially continuous stop shoulder (11) extending along an entire circumference of the opening (6).

6. A fastening element according to claim 1, wherein the closing cover (7, 8) has a predetermined bending line (12) extending from the flexor (9) to a free end of the closing cover (7, 8).

7. A fastening element according to claim 1, wherein the flexor (9) is formed as a film hinge.

8. A fastening element according to claim 1, comprising two closing covers (7, 8) attached to the clamping member (2) at opposite sides of the opening (6), each closing cover (7, 8) extending from a respective linear flexor (9) in a direction toward another closing cover (7, 8).

9. A fastening element according to claim 8, wherein each closing cover (7, 8) covers about half of the opening (6) in a closed position thereof.

* * * * *